UNITED STATES PATENT OFFICE.

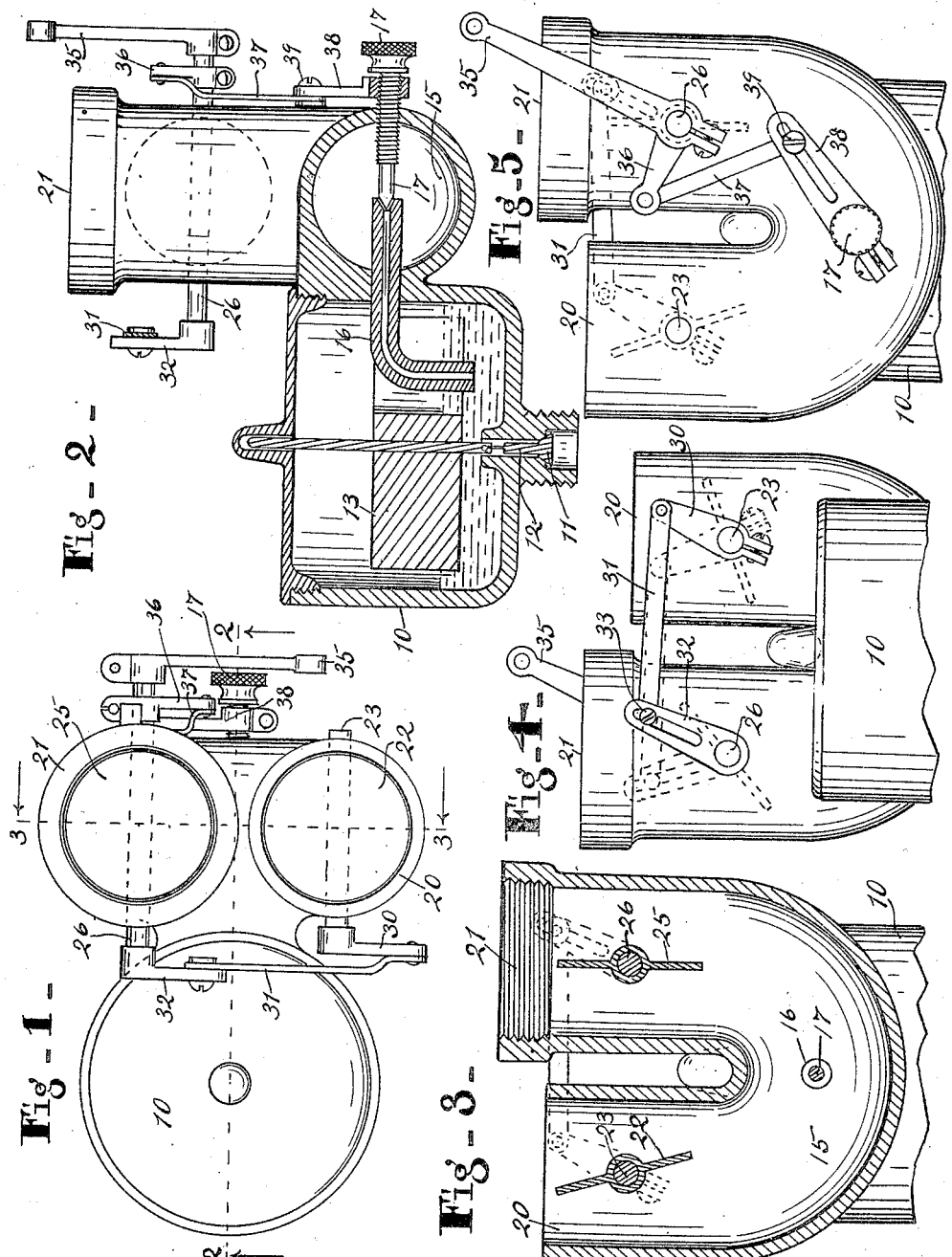

EDGAR M. STEVENSON, OF INDIANAPOLIS, INDIANA, ASSIGNOR TO THE CHAPIN MANUFACTURING COMPANY, OF INDIANAPOLIS, INDIANA, A CORPORATION.

CARBURETER.

1,000,451. Specification of Letters Patent. Patented Aug. 15, 1911.

Application filed January 20, 1908, Serial No. 411,659. Renewed December 29, 1910. Serial No. 600,084.

*To all whom it may concern:*

Be it known that I, EDGAR M. STEVENSON, of Indianapolis, county of Marion, and State of Indiana, have invented a certain new and useful Carbureter; and I do hereby declare that the following is a full, clear, and exact description thereof, reference being had to the accompanying drawings, in which like letters refer to like parts.

The object of this invention is to improve the construction and operation of carbureters.

One feature of the invention consists in combining with the float chamber a U-shaped chamber at the side thereof into the lower portion of which the fuel is adapted to enter from the float chamber and the air is adapted to enter through one upper end of the U-shaped portion and pass down through the lower portion of the U-shaped chamber and mix with the fuel and the resultant gas pass upwardly through the other end of the U-shaped chamber, and the provision of valves to control the fuel, the air inlet and the gas outlet, and single adjustable means for controlling the operation of all of said valves, whereby they will all operate simultaneously and the relative movements of them can be adjusted.

I do not wish to limit the invention to a U-shaped chamber, as it may be V-shaped or any other substantially U-shape.

The full nature of my invention will be understood from the accompanying drawings and the following description and claim.

In the drawings Figure 1 is a plan view of the carbureter with the air inlet and gas outlet valves closed. Fig. 2 is a central vertical section through the carbureter on the line 2—2 of Fig. 1, the outlet valve being shown open by dotted lines. Fig. 3 is a vertical transverse section on the line 3—3 of Fig. 1, showing the valves open. Fig. 4 is a left hand elevation of the device shown in Fig. 3 with the lower part broken away and the altered position of the parts being indicated by dotted lines. Fig. 5 is a right hand elevation of the device as shown in Fig. 1.

The device shown in the drawings has a bowl 10 or gasolene chamber to which gasolene is supplied from any suitable source through the nipple 11, the inlet therethrough to the float chamber being controlled by the valve 12 which has a float 13 secured to it within the float chamber.

A substantially U-shaped mixing chamber 15 is secured to one side of the float chamber and into its lower portion the fuel inlet pipe 16 leads from the float chamber. Said fuel inlet is controlled by the needle valve 17 which is screw mounted in the wall of the mixing chamber 15, see Fig. 2. Thus the fuel enters the U-shaped mixing chamber about midway of its lower end. The air inlet 20 constitutes one upwardly extending branch of the U-shaped mixing chamber and the gas outlet 21 is the other upwardly extending branch thereof. The air inlet is controlled by a valve 22 on a small shaft 23 projecting diametrically through the walls of the air inlet, and the throttle valve 25 controls the gas outlet 21, it being mounted on a shaft 26 similar to shaft 23. On the side of the mixing chamber 15 next to the float chamber and above it the shaft 23 has a crank 30 secured to it, from which a connecting bar 31 extends to the crank 32 secured on the shaft 26. The crank 32 is slotted for the adjustable connection of the bar 31 by the screw 33, whereby the relative positions of said two valves 22 and 25 may be adjusted, and their relative opening movements be modified. Thus, when the bar 31 is connected with the crank 32 rather close to the shaft 26 the air valve 22 will open more slowly than the throttle valve 25.

On the side of the mixing chamber opposite the float chamber a throttle lever 35 is secured to the shaft 26 and also a crank 36 is secured thereto with a connecting rod 37 extending from said crank to a crank 38 on the needle valve 17. The connection between the bar 37 and the crank 38 is adjustable by the screw 39 fitting in a slot in said crank, whereby the operation of the needle valve 17 may be adjusted with reference to the action of the other valves 22 and 25. Thus, if the connection of the bar 37 with the crank 38 is rather close to the needle valve 17, said needle valve will open more rapidly than the other valves. It is thus seen that I have in this device a practical and successful form of carbureter, as the air enters through the inlet 20, moves down to the fuel inlet and mingles therewith and forms a gas that moves upwardly through the fuel outlet. Likewise, the single throttle lever controls and simultaneously operates the air valve, the fuel inlet valve, and the gas outlet valve, establishing a relativity of operation between them.

What I claim as my invention and desire to secure by Letters Patent is:—

In a carbureter the combination of a float chamber, a substantially U-shaped mixing chamber with an upwardly extending air inlet in one side thereof and an upwardly extending gas outlet at the other side thereof, a fuel inlet from the float chamber to the lower part of said mixing chamber, a valve for controlling said fuel inlet, a crank mounted externally on said fuel inlet valve, a valve for controlling the gas outlet mounted upon a shaft extending thereto, a throttle lever secured to said shaft, a crank on said gas outlet valve shaft, a bar connecting said cranks, one of said cranks being slotted whereby the connection may be adjustable, a valve for closing the air inlet, a shaft on which it is mounted, cranks on the external ends of the shafts of said air inlet and gas outlet valves, and a connecting bar between said cranks, said cranks being slotted to make the connection adjustable, substantially as set forth.

In witness whereof, I have hereunto affixed my signature in the presence of the witnesses herein named.

EDGAR M. STEVENSON.

Witnesses:
 OLIVE BREEDEN,
 V. H. LOCKWOOD.